United States Patent
Kaler et al.

(10) Patent No.: US 7,636,939 B2
(45) Date of Patent: Dec. 22, 2009

(54) ENDPOINT IDENTIFICATION AND SECURITY

(75) Inventors: Christopher G. Kaler, Sammamish, WA (US); Douglas A. Walter, Issaquah, WA (US); Giovanni M. Della-Libera, Seattle, WA (US); Melissa W. Dunn, Woodinville, WA (US); Richard L. Hasha, Seattle, WA (US); Tomasz Janczuk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 702 days.

(21) Appl. No.: 11/009,926

(22) Filed: Dec. 10, 2004

(65) Prior Publication Data

US 2006/0130127 A1 Jun. 15, 2006

(51) Int. Cl.
*G06F 7/04* (2006.01)
*G06F 17/00* (2006.01)
*H04L 29/06* (2006.01)
*H04L 9/32* (2006.01)
*H04K 1/00* (2006.01)

(52) U.S. Cl. .............. 726/7; 726/14; 713/161; 713/162; 713/168; 713/170; 713/171; 713/178; 380/255

(58) Field of Classification Search ............. 726/7
See application file for complete search history.

(56) References Cited

U.S. PATENT DOCUMENTS

| 5,633,933 | A | 5/1997 | Aziz | 380/30 |
| 5,657,390 | A | 8/1997 | Elgamal et al. | 713/151 |
| 6,796,489 | B2 * | 9/2004 | Slater et al. | 235/379 |
| 7,051,042 | B2 * | 5/2006 | Krishnaprasad et al. | 707/102 |
| 7,320,019 | B2 * | 1/2008 | Malik | 709/206 |
| 7,522,591 | B2 * | 4/2009 | Kiyoto et al. | 370/389 |
| 2003/0005331 | A1 * | 1/2003 | Williams | 713/201 |
| 2004/0111461 | A1 * | 6/2004 | Claudatos et al. | 709/200 |
| 2004/0162901 | A1 * | 8/2004 | Mangipudi et al. | 709/225 |
| 2004/0179684 | A1 * | 9/2004 | Appenzeller et al. | 380/44 |

(Continued)

FOREIGN PATENT DOCUMENTS

GB 2405293 A * 2/2005

(Continued)

OTHER PUBLICATIONS

Inoue, Atsushi, et al. "IP Layer Security and Mobility Support Design Policy and an Implementation" Global Network Evolution: Convergence or Collision? Toronto, Sep. 21-26, 1997 International Switching Symposium, Toronto. vol. 1, Sep. 21, 1997, pp. 571-577.

(Continued)

*Primary Examiner*—William R Korzuch
*Assistant Examiner*—Aravind K Moorthy
(74) *Attorney, Agent, or Firm*—Workman Nydegger (57) ABSTRACT

A data structure with endpoint address and security information. The data structure includes an address field that includes one or more endpoint addresses for an entity. The data structure further includes a security field that includes one or more keys for facilitating secure communications with the entity. The data structure may also be such that the contents of the address field and the security field are serialized in the data structure. The data structure may be extensible such that new address fields and security fields may be added.

27 Claims, 5 Drawing Sheets

U.S. PATENT DOCUMENTS

2004/0199581 A1* 10/2004 Kucharewski et al. ....... 709/204
2005/0114453 A1*  5/2005 Hardt ......................... 709/206
2005/0198351 A1*  9/2005 Nog et al. ................... 709/232
2006/0048209 A1*  3/2006 Shelest et al. .................. 726/1
2006/0294219 A1* 12/2006 Ogawa et al. ............... 709/224
2008/0186897 A1*  8/2008 Rune et al. ................. 370/315

OTHER PUBLICATIONS

Kent, S, et al. "IP Encapsulating Security Payload (ESP)" Internet Engineering Task Force, Nov. 1998, pp. 3-4 and 7-9.

Christensen, Erik, et al. "Web Services Description Language (WSDL)" Mar. 15, 2001, pp. 1-8, 12, 21-22, 29, retrieved from the internet: URL: http://www.w3.org/TR/wsdl>.

* cited by examiner

ENDPOINT IDENTIFICATION AND SECURITY

BACKGROUND OF THE INVENTION

1. The Field of the Invention

The invention generally relates to the field of communications between endpoints. More specifically, the invention relates to identifying addresses to endpoints for entities and to providing security information for secure communications to the endpoints.

2. Description of the Related Art

Modern computer networking has become so ubiquitous so as to be present in nearly all types of communications. As examples, computer networks are used to transmit email data. Computer networks are used to access vast repositories of static and dynamic data such as that which can be accessed through the Internet or other wide area networks and local area networks. Additionally, computer networks are the primary medium used to transmit voice and fax data between switching points in modem telephone applications.

Data on networks travels from one endpoint to another endpoint. The data may travel through other points during transmission to endpoints. Endpoints are typically addressable, meaning that a specific address, such as an Internet Protocol (IP), Media Access Control (MAC) address, uniform resource identifier (URI) may be used to identify the endpoint. Exemplary endpoints include processors, servers, web services, email addresses, resources and the like.

With the vast amounts of useful data being transmitted on networks, malicious and/or unethical individuals have expended countless resources in devising ways to compromise networks. These individuals can extract data from a compromised network for fraudulent or malicious use. For example, an e-commerce transaction that includes passing credit card information between endpoints may be compromised allowing an individual to fraudulently use the credit card information in obtaining goods or services.

Individuals use a number of methods to compromise a network. For example, an individual may "tap" a network line to "listen" to communications on the network. Alternatively, an individual may use "spoofing" techniques. Spoofing involves sending information from a resource, such as a computer, cpu, web server, etc. that appears to be a resource other than the resource sending the information. For example, a fraudulent web server may send information identifying itself by an internet protocol (IP) address that is trusted by an individual accessing the web server, when in fact the web server is a web server with an IP address different than the IP address being asserted.

Various techniques have been used to combat network compromising activities. To name a few, encryption is used to scramble data so as to make it non-understandable to an individual who has tapped the network. To prevent spoofing, various authentication techniques have been implemented requiring presentation of identification information. Thus a resource provides a token, such as a password, to verify its identity to other resources on the network.

Some security systems use a pre-session boot-strap. A pre-session bootstrap involves an exchange of information between endpoints to authenticate the endpoints prior to sending and receiving the data that is the subject of the session. Prior to sending the authentication information, a user trying to access an endpoint cannot verify that the endpoint being communicated with is a trusted endpoint, or the desired endpoint. Thus, the pre-session boot strap exchange is essentially an un-trusted exchange where spoofed data may be transmitted and received. It would therefore be new and useful to have a system that eliminates the need for pre-session bootstrap security exchanges or that makes the pre-session boot strap exchanges more secure.

Another challenge with existing systems is that references storing addresses typically include a single address where information can be routed. For example a reference may include an email address for an individual. However, if the email address is a work email address, it is likely that the individual may not receive some messages sent to that address in a timely manner, such as when the individual is away from work. Additionally, an individual may have several addresses where they can be contacted. Current systems require a user desiring to send messages to the individual to select the appropriate address for the user. It would therefore be new and useful to have a system that allows for an individual to address a message to a particular identity and to have that message reach the most appropriate endpoint for the particular identity.

BRIEF SUMMARY OF THE INVENTION

One embodiment includes a data structure that includes an address field. The address field includes one or more endpoint addresses for an entity. The data structure further includes a security field including one or more keys, such as cryptographic keys, for facilitating secure communications with the entity. The contents of the address field and the security field are serialized in the data structure. The data structure is extensible such that new address fields and security fields may be added.

Another embodiment includes a data structure that includes an identity field. The identity field identifies an entity. The data structure further includes an address field that includes one or more endpoint addresses for the entity. The contents of the identity field and the address field are serialized in the data structure. The data structure is extensible such that new identity fields and new address fields may be added.

Another embodiment includes a method of creating a reference data structure. The method includes an act of creating an address field that includes one or more endpoints addresses for an entity. The method further includes creating a security field that includes one or more keys for facilitating secure communications with the entity. The method also includes serializing data in the address field and the security field to create a serialized extensible data structure.

Yet another embodiment includes a method of creating a reference data structure. The method includes an act of creating an identity field that includes data identifying an entity. The method further includes creating an address field that includes one or more endpoints addresses for the entity. Additionally, the method includes serializing data in the identity field and the address field to create a serialized extensible data structure.

One embodiment includes a method of communicating between endpoints on a network. The method includes accessing a serialized extensible data structure to obtain an endpoint address for an entity on a network. The method further includes accessing the serialized extensible data structure to obtain a security key. Further, the method includes encrypting data using the security key. Additionally, the method includes sending the data to the endpoint address for the entity on the network Some embodiments described herein facilitate communications on a network without the need for a pre-session security bootstrap security exchange. This is accomplished by having security information serialized with endpoint address information. Embodiments also allow for an identity to be used for an entity where the identity can be used to identify a number of endpoint addresses for accessing the entity.

These and other advantages and features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

In one embodiment, the need for a pre-session bootstrap is eliminated by an entity already having expected security information in a reference with the address for addressing another entity. When the security information includes an encryption key, an entity with the reference can send and receive encrypted information to the other entity at the outset of communicating with the other entity.

Figure 1:
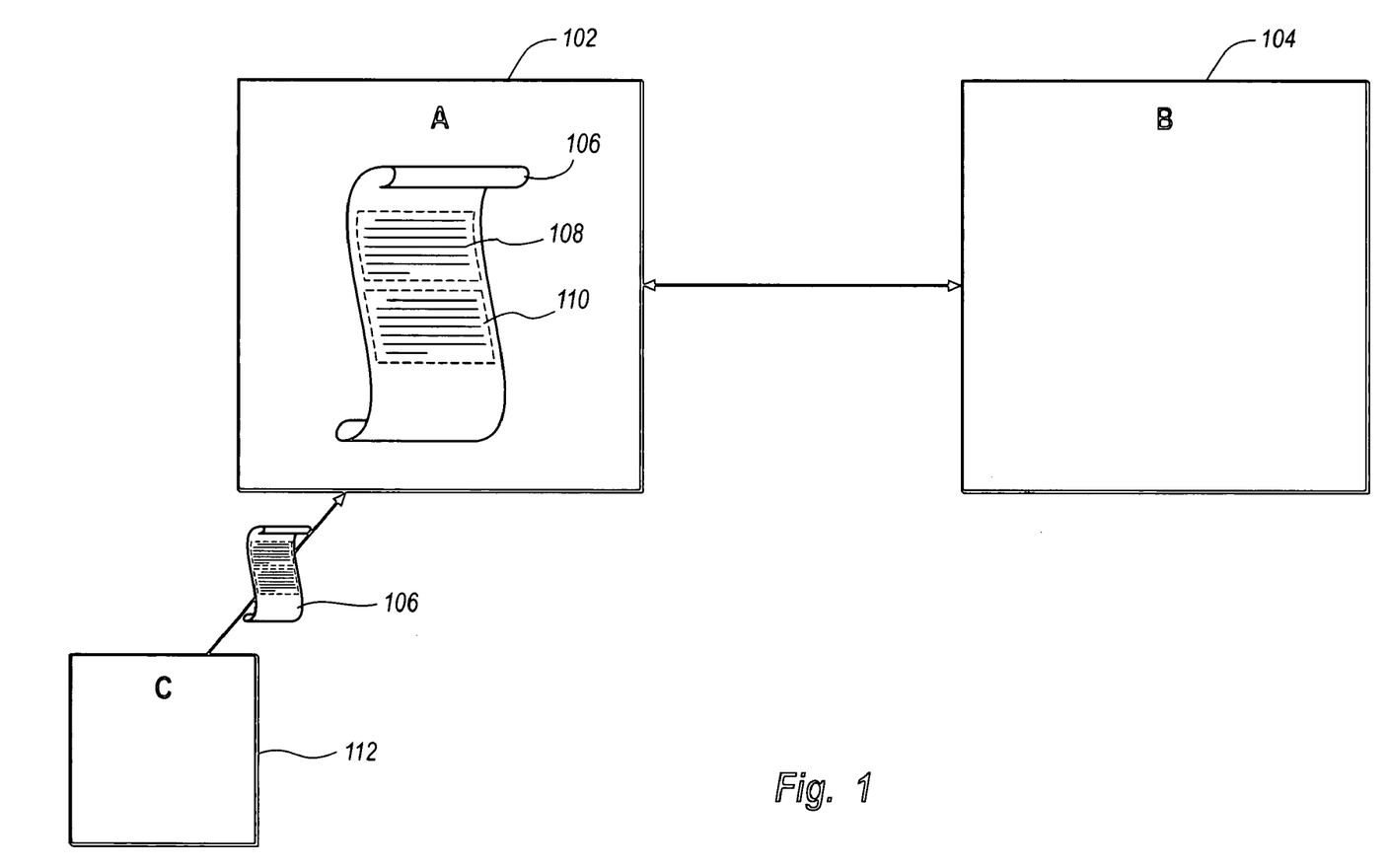
FIG. 1 illustrates exemplary endpoint communicating where endpoint and security information is stored in a reference.

FIG. 1 illustrates one environment where embodiments of the present invention may be practiced. An entity A 102 may have a need to begin a session with an entity B 104. Entity A 102 has possession of a data structure 106 illustrated by a scroll. The data structure 106, in this embodiment, is a reference that includes an address field 108 and a security information field 110.

The address field 108 includes at least one address for entity B. The address may be for example, a MAC address for a processor, a uniform resource locator (URL) or a uniform resource identifier (URI) for web services, an email address for email communications, a phone number for telephone, fax, pager, and/or cell-phone communications, an internet messaging (IM) address, a physical mail address, and the like.

The security information field 110 may include, for example, security information such as identity, verifiable proof, encryption keys, certificates, passwords and the like. In one embodiment, the security information includes information that is expected to be returned from entity B when entity A attempts to open a session with entity B. Alternatively, the security information may be useful in identifying information that is sent by entity B during a session as part of the data transmission of the session. In some embodiments, the security information field may contain a public key for encrypting and decrypting data. When the security information field includes a key for encrypting data, entity A 102 can begin sending encrypted data to entity B 104. If entity B 104 is not able to respond, it is likely that entity B 104 does not have the private key corresponding to the public key used by B 104, and thus entity B 104 is likely a spoofer. Entity A 102 therefore closes any open session with entity B 104 to prevent malicious acts by entity B 104.

Some specific security information that may be included in the security information field 110 includes Service Principal Name (SPN), User Principal Name (UPN), an X.509 thumbprint, a security token, an issuer and serial number, a public key from a Pretty Good Privacy (PGP) scheme, an embedded certificate, a verifiable DNS claim and the like.

Security information may also include data representative of biometric authentication data. For example, the security information field 110 may include information that represents fingerprints, iris scans, voice recognition, DNA recognition, and the like.

In one embodiment, the data structure 106 may be received by entity A 102 out-of-band from a third party such as entity C 112 shown in FIG. 1. Embodiments allow data, including address information and security information to be serialized. For example, in one embodiment, the data structure 106 may be an extensible Markup Language (XML) document. A sample XML block including address and security information may be structured as follows:

```
<wsa:EndpointReference>
    <wsa:Address>http://wh1.fabrikam123.com/Purchasing</wsa:Address>
    <wsi:Security>
        <wsi:DnsClaim>fabrikam123.com</wsi:DnsClaim>
    </wsi:Security>
</wsa:EndpointReference>
```

In this example, the security field includes a verifiable DNS claim for a website identified in the address field. This verifiable DNS claim may be used in a fashion similar to secure HTTPS (TLS/SSL) protocols. Security information passed from entity B 104 to entity A 102 during a session may be verified by entity A 102, the consumer of the information. Embodiments of the invention further allow for the extension of existing security specifications. For example, embodiments may include providing identity information through https or through methods described in one of the Web Services (WS) Security specifications.

Embodiments of the invention allow for multiple pieces of security information to be included in the security information field 110. Thus, security can be increased by requiring multiple pieces of security information. This example is analogous to when an individual is required to provide two (or more) forms of identification to verify their identity. An example of an XML block with multiple pieces of security information is as follows:

```
<wsa:EndpointReference>
    <wsa:Address>http://wh1.fabrikam123.com/Purchasing</wsa:Address>
    <wsi:Security>
        <wsi:SecurityChoices>
            <wsi:Security>
                ...choice 1...
            </wsi:Security>
            <wsi:Security>
                ...choice 2...
            </wsi:Security>
            <wsi:MultipleSecuritiesRequired>
```

-continued

```
        <wsi:Security>
            ...required security 1...
        </wsi:Security>
        <wsi:Security>
            ...required security 2...
        </wsi:Security>
    </wsi:MultipleSecuritiesRequired>
    </wsi:SecurityChoices>
  </wsi:Security>
</wsa:EndpointReference>
```

Various security requirements and rules may be implemented that allow various pieces of security information to be used for authentication. For example, the security information field 110 may allow for Boolean combinations of pieces of security information. The security rules may require two specific pieces of security information. Alternatively, the security rules may allow one piece of security information to be substituted for another. Other rules may allow for pieces of security information to be applicable for specific kinds of interactions, communications channels, times of the day, message sizes, type of message content and the like.

Further, because a reference includes security information, security rules may be established at an entity based on addressable fields such as "To," "From" and "Reply To" fields in web service communications. For example, if an entity A 102, which has a data structure 106 with security information for another entity B 104 receives a message from entity B 104, authorization for security access may be based on the "To," "From" "Reply To" or other fields because access may be pre-authorized.

When a reference, such as the data structure 106, is received, there is a need to ensure that the security information in the security information field 110 is reliable and trustworthy. In one embodiment, this can be accomplished when the reference is received from a third party entity C 112, where the third party is a trusted source and the reference passes only through the trusted third party entity C 112. When a trust chain cannot be established, some embodiments of the invention allow the reference to be enveloped by an embedded signature. The signature may envelop both the reference and its data. In one embodiment, this may be accomplished by using an XML enveloped signature. Other signature representations may also be used. Still other embodiments use a security header, such as a WS-Security security header, that is embedded in the reference. Using a security header allows for multiple signatures and encryption. In still other embodiments, the data structure 106 may be signed with the signature stored separately from the data structure 106.

Figure 2:
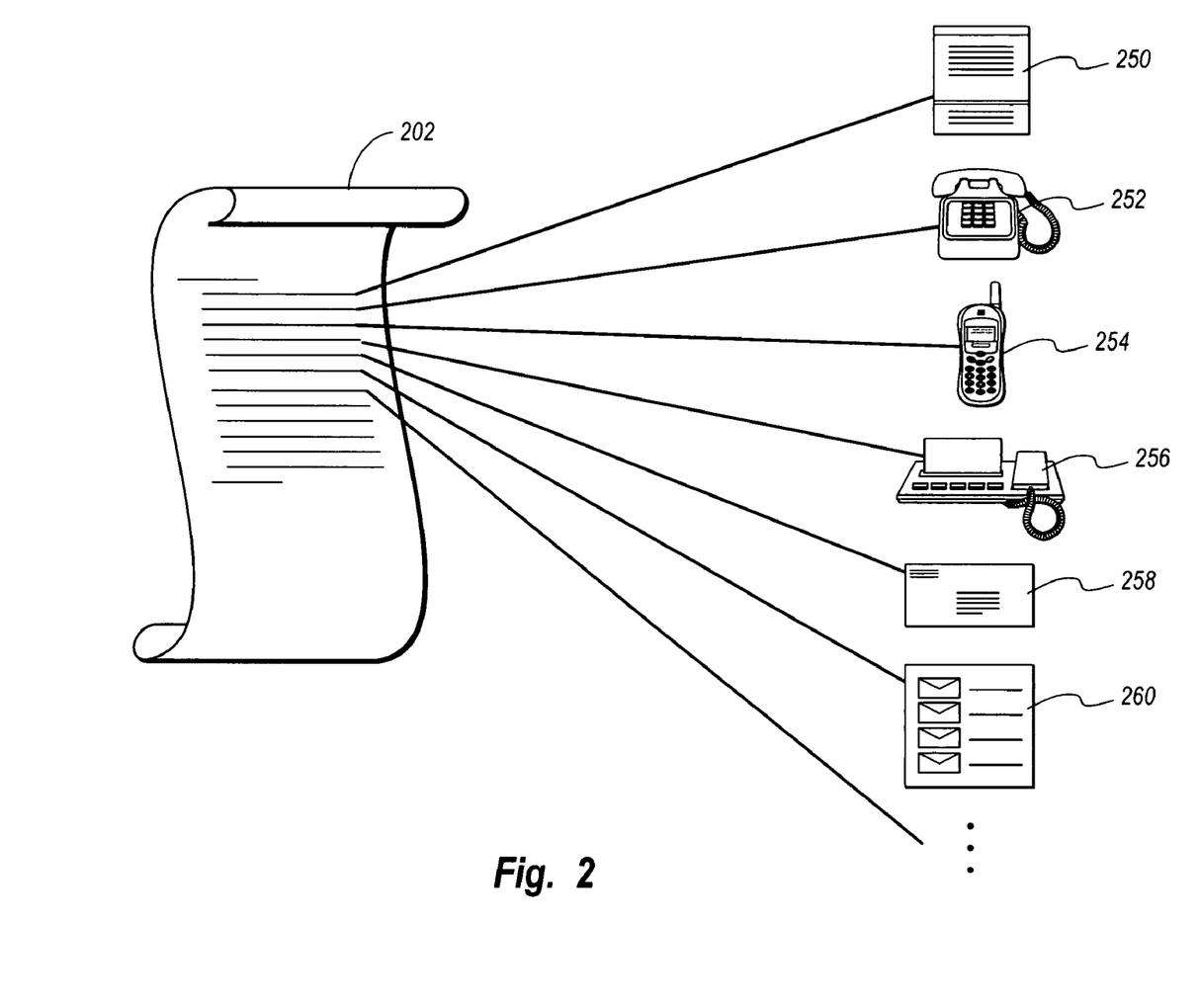
FIG. 2 illustrates a sample reference that includes a number of endpoint addresses.

Referring now to FIG. 2, other aspects are illustrated including the concept of an Uber (or global) identity for an entity. Specifically, a data structure 202 may specify endpoint addresses where messages can be delivered to an entity. The data structure 202 includes an identity field and endpoint address fields. The identity field includes an identity that can be used to address messages to an entity generally. The address fields contain the specific endpoint addresses where messages can be sent. Thus, a user can use the Uber identity for an entity without specifically needing to provide an address for a particular type of medium or endpoint for accessing the entity. The data structure 202 may be part of the data structure 102 shown in FIG. 1. Alternatively, the data structure 102 may be part of the data structure 202. In yet other embodiments, the data structure 202 may contain references to a number of different data structures such as the data structure 102 shown in FIG. 1.

FIG. 2 illustrates that the data structure 202 contains fields for specifying various endpoint addresses for an entity. The fields in the data structure 202, in this example, specify addresses for internet messaging (IM) clients 250, land line telephone numbers 252, cell phone numbers 254, fax numbers 256, physical mail address 258, email addresses 260, and the like. In one embodiment, a delegate may also be used as an address for an entity. For example, an address belonging to a different entity may be used as an address for an entity. This may be useful, for example, when an entity has delegated certain types of tasks to other entities. For example, if an entity has delegated administrative tasks to an administrative assistant, emails related to administrative issues may be directed to an email address included in the reference, but belonging to the administrative assistant. In one alternate embodiment, the data structure may further include information about the entity to which tasks are delegated. Such information may include identity information, delegation scope, and the like.

In the present embodiment, an extensible data structure 202 such as an XML document is used. In this way, the addresses are not limited to a preset group of addresses, but rather various addresses may be added as need or technology increases.

Embodiments allow for rules to be specified in the data structure 202 regarding what communications mediums and addresses can be used to access a specific endpoint for an entity. Policy rules may also be stored with the address that indicates when, why and how a specific endpoint for an identity is used. An example of a data structure implementing one embodiment is as follows:

```
<UberIdentity>
    <GlobalIdentity>...</GlobalIdentity>
    <GlobalIdentityVersion>...</GlobalIdentityVersion>
    <Endpoints>
        <Endpoint>
            ...endpoint identification...
            <SelectionPolicy Preference="...">
                <Transports>...</Transports>
                <Protocols>...</Protocols>
                <DateTimeRange>...</DateTimeRange>
                <Sensitivities>...</Sensitivities>
                <Size>...</Size>
                <Urgency>...</Urgency>
                <Priority>...</Priority>
                <Classification>...</Classification>
                <Topics>...</Topics>
            </SelectionPolicy>
        <Endpoint>
        ...
    </Endpoints>
</UberIdentity>
```

In this example, an XML block includes a listing of endpoint addresses. Within the endpoint addresses are policies describing preferences for when a particular endpoint should be used. Specifically, this example shows criteria for selecting an endpoint based on a set of transports or protocols available, date and/or time ranges, the sensitivity of the data being sent to the entity, the urgency or priority of the data being sent to the entity, the classification of the data being sent to the entity (e.g. work or personal), the topic of the data being sent to the entity and the like.

Other embodiments allow for endpoint addresses to be listed within a list of policy statements in the data structure 202. Still other embodiments anticipate that no policy information is provided. In this case, an endpoint address can be selected using other mechanisms. Addresses may be selected by a user that has been securely prompted, a machine registered default, an application registered default, a user registered default, invoking application specific logic, using custom registered extensions, considering other aspects of the data or desired action, and the like.

In some embodiments, endpoint address decisions may be based on the specific recipient or attributes of the recipient. For example, selection of an endpoint address may be based on attributes such as identity, address class, general attributes, privacy policy and the like. Other complex expressions may also be used to determine which endpoint address to use to contact an entity. For example, an expression may direct the use of a particular address during business hours, if the entity is logged on to an IM and if presentation software is not running in presentation mode.

Further, address endpoint decisions may be made based on the presence of an entity at a location where the entity can be contacted by reference to an endpoint address. Various mechanisms can be used to determine if an entity is present at an endpoint address. For example, IM services, such as Microsoft Messenger, Yahoo Messenger, ICU and the like, publish when entities are on-line. An endpoint reference may be used to determine the presence of an entity. Endpoint and Web Services Description Language (WSDL) contracts may be used to determine that an entity is present. The presence of a machine on a network, as displayed in a list of clients, may be used to determine that an entity is present at the machine. An entity's expected location based on time-of-day may be used to determine that an entity is present. An attempt to connect, such as by pinging an address or requesting to open a session, may be used to determine that an entity is present. Peer to peer presence data may be used to determine that an entity is present at a particular endpoint address. Specific applications running may be used to determine that an entity is present. An application mode, such as a show mode that shows users, may be used to determine an entities presence.

Some embodiments facilitate merging of two or more Uber-identities. For example, an entity, such as entity A 102 in FIG. 3, may receive endpoint address information in a reference data structure 106 for entity B 104 from entity C 112. An additional reference in a data structure 370 may be received by entity A 102 from entity D 372 with additional endpoint addresses for entity B 104. Addresses from the data structure 106 and the data structure 370 are combined into a merged reference represented by the data structure 306.

Figure 3:
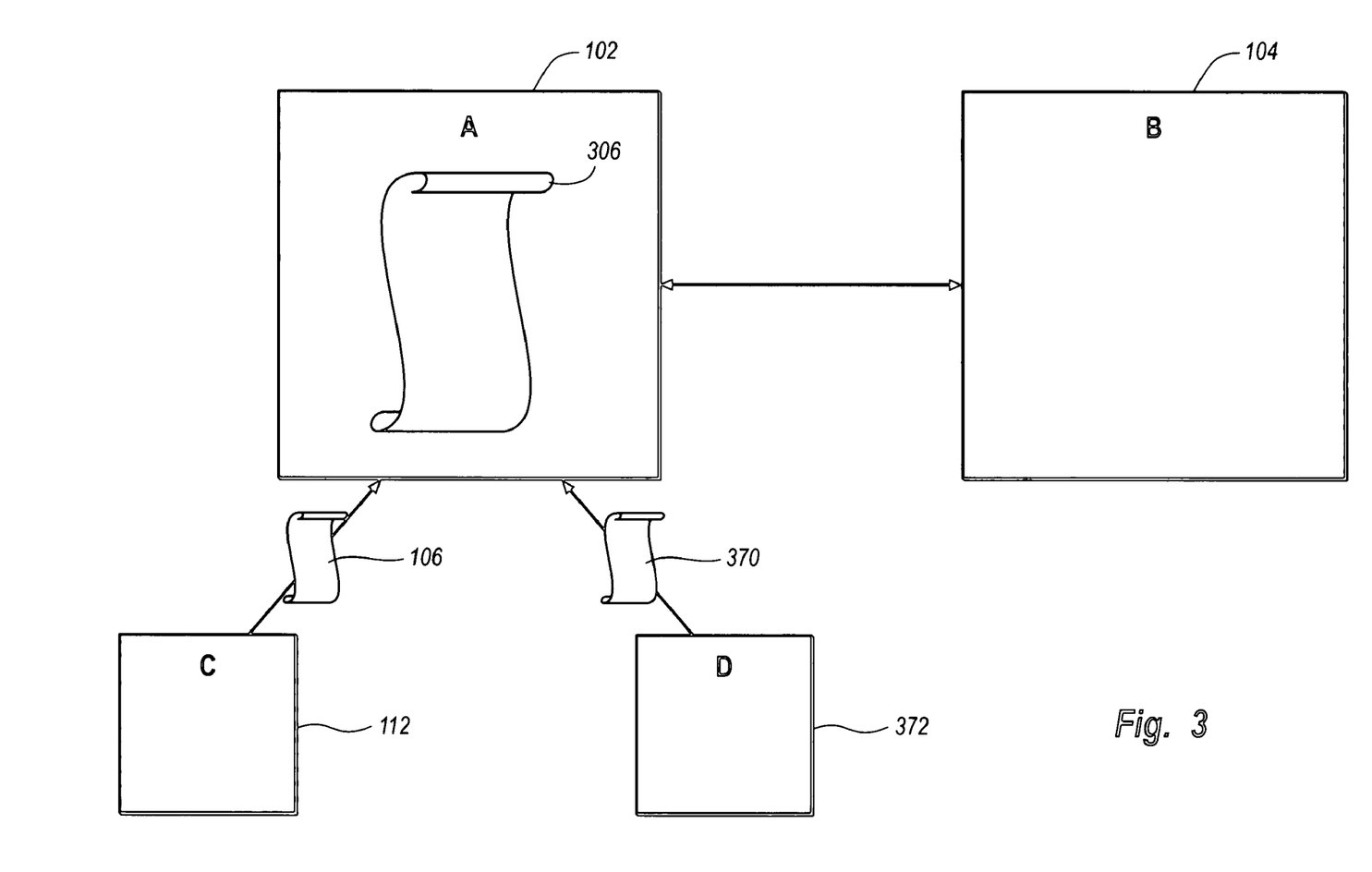
FIG. 3 illustrates an example of references being merged to from a merged reference.

When references are merged, there is a possibility that conflicting information will be present. For example, the data structure 106 and data structure 370 may have different work email addresses for an entity. There are several methods that may be used to resolve conflicting data. These methods include: securely prompting a user to resolve the conflict, using machine registered defaults, using application registered defaults, using user registered defaults, invoking application specific logic, using custom registered extensions, considering various aspects of the data being sent to an entity or actions desired, selecting the most recently entered address, and the like.

While the embodiments illustrated here have shown the Uber-identity as a reference document, other embodiments allow for Uber-identity to be a collection of pointers to other reference documents. For example, an XML Uber-identity document may contain references to XML reference document where the reference documents include address and security information fields.

In some embodiments an UberIdentity may further include an incrementing value set forth above as the GlobalIdentityVersion. This value is incremented when any of the values in the EndPoints portion of the UberIdentity changes. In this way, UberIdentity references may be cached such that newer references may be detected.

Embodiments contemplated by the present invention allow for methods of forwarding an identity document or reference document to other entities. Some embodiments, therefore, are able to designate when information may be shared. For example, a reference may include a number of addresses. Some of the addresses may be identified as sharable, while others are not. Thus, when the reference is forwarded to other entities, non-sharable addresses are removed from the reference prior to sending to the other entities. In one example, a well behaved program can recognize shareable properties or non-shared properties and addresses of a reference. The well behaved program can remove non-shared properties and addresses from the reference before forwarding the reference to other applications or entities.

Security and verifying references in embodiments including an Uber-identity may be similar to the security of references described above in conjunction with the description of FIG. 1. Methods of verifying a reference with an Uber-identity include a recipient of a reference with an Uber-identity verifying all keys and tokens before accepting and/or using them. Verification may be accomplished, for example, by securely prompting a user, locating the key or token in a trusted or verified store, cross-attesting or verifying with trusted parties, sending alternate forms of the identity, securing by a key or other cryptographic check and the like. Cross-attesting could be implemented in one example by an Uber-identity having a signature component similar to those describe previously herein. Further, the Uber-identity includes one or more attestation element containing cross attestation, certification, and/or verification statements from other entities. In one embodiment, the attestation element may include information indicating the type of attestation and/or the strength of verification claimed. Some embodiments allow the Uber-identity reference to be encrypted. Specifically, in one embodiment, security policy may be provided in the clear while the actual data making up the Uber-identity reference is encrypted for certain entities.

Figure 4:
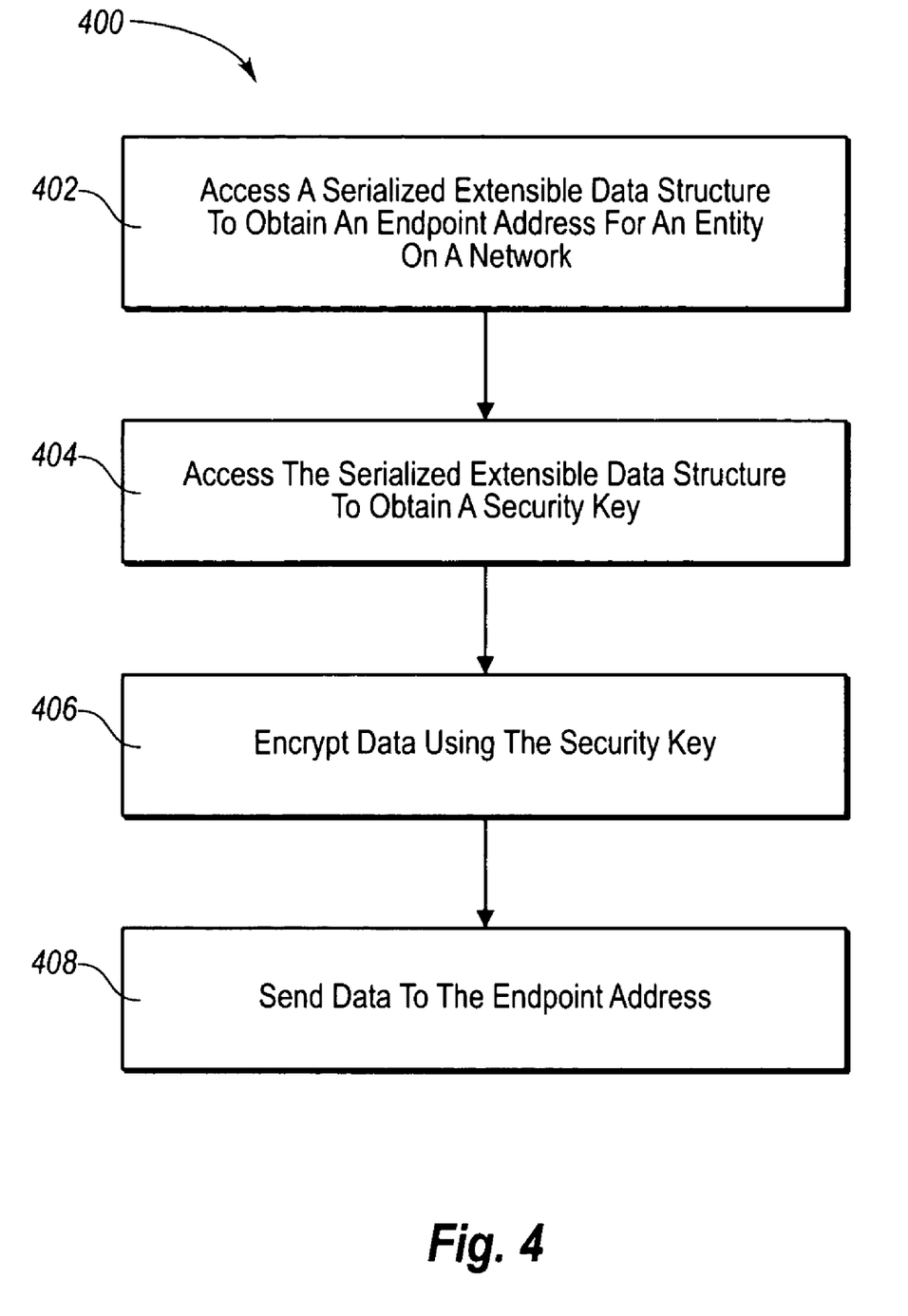
FIG. 4 illustrates a method implemented in one embodiment of the present invention.

Referring now to FIG. 4, one embodiment of the invention is illustrated as a method including various acts. The method shown in FIG. 4 facilitates communication between endpoints on a computer network. The method 400 includes an act of accessing a serialized extensible data structure to obtain an endpoint address for an entity on a network (act 402). The data structure may be a data structure such as data structure 106 shown in FIG. 1, data structure 202 shown in FIG. 2, data structure 306 and data structure 372 shown in FIG. 3. The endpoint address may include one or more addresses stored in the address field 108 shown in FIG. 1. The act of accessing a serialized extensible data structure to obtain an endpoint address (act 402) may further include accessing policy rules to determine which endpoint address to select from a plurality of endpoint address for the entity. Rules for selecting an endpoint address are described above herein.

The method 400 further includes an act of accessing the serialized extensible data structure to obtain a security key (act 404). The security key may be security information in the security information field 110 shown in FIG. 1. As described above, the security key may be a public key or other encryption key used for encrypting data. The act of accessing the serialized extensible data structure to obtain a security key (act 404) may further include accessing security rules to determine the appropriate security key to obtain.

The method 400 further includes an act of encrypting data using the security key. Encrypting may be accomplished using any suitable encryption method. Methods of encryption have been described previously herein.

The method 400 further includes an act of sending data to the endpoint address. In this way, the method 400 facilitates sending data between endpoints on a network without the need for a pre-session security bootstrap.

Figure 5:
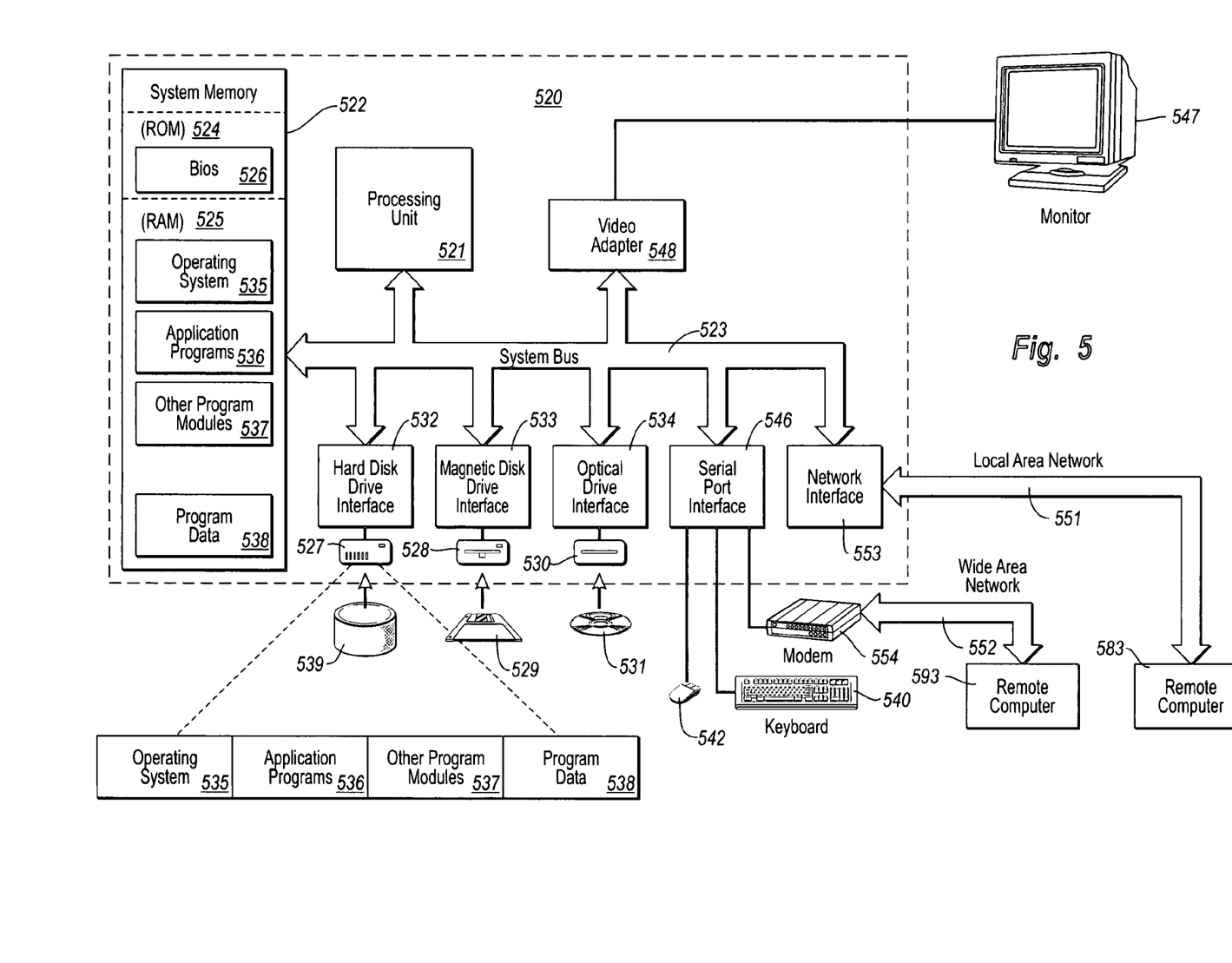
FIG. 5 illustrates one environment where certain aspects of the present invention may be practiced.

With reference to FIG. 5, an exemplary system for implementing the invention includes a general purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disk drive 530 for reading from or writing to removable optical disk 531 such as a CD-ROM or other optical media. The magnetic hard disk drive 527, magnetic disk drive 528, and optical disk drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disk 531, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 539, magnetic disk 529, optical disk 531, ROM 524 or RAM 525, including an operating system 535, one or more application programs 536, other program modules 537, and program data 538. A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 583 and 593. Remote computers 583 and 593 may each be another personal computer, a server, a router, a network PC, a peer device or other common network node, and typically include many or all of the elements described above relative to the computer 520. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A data structure that is stored on a computer readable medium, the data structure comprising:
   a SOAP header that contains the following fields:
      an Uber identity field that includes an Uber name that globally identifies an entity and that associates the entity with a plurality of different endpoint addresses where one or more messages are deliverable to the entity and wherein the Uber name does not specify which of the plurality of endpoint addresses is used for sending a message to the entity;
      an address field, the address field comprising:
         the plurality of endpoint addresses, which are each associated with the entity;
         one or more policies describing when a particular endpoint address is used to send messages to the entity, the one or more policies comprising criteria including at least one of date and/or time ranges, sensitivity of data, urgency or priority of data classification of data, topic of data, user selection as a result of prompting, a machine registered default, an application registered default, a user registered default, application specific logic, custom registered extensions, recipient attributes, or presence of an entity; and
         wherein the address field specifies which of the plurality of endpoint addresses is used in delivering the one or more messages by implementing the one or more policies;
      a security field that comprises one or more keys for facilitating secure communications with the entity through at least one of the plurality of endpoint addresses; and
      wherein the contents of the Uber identity field, the address field and the security field are serialized in the data structure and wherein the data structure is extensible such that new address fields and new security fields may be added in such a way as to be generally associated with the entity though the Uber identity.

2. The data structure of claim 1, wherein the address field contains one or more references including addresses and security information.

3. The data structure of claim 1, wherein the endpoint addresses comprise at least one of a MAC address, a URL, a URI, an email address, a phone number, an IM address and a physical mail address.

4. The data structure of claim 1, wherein the address field contains an address for a delegate entity identified for the entity.

5. The data structure of claim 1, wherein the security field comprises at least one of a SPN, a UPN, an X.509 thumbprint, a security token, an issuer and serial number, a public key, an embedded certificate, and a verifiable DNS claim.

6. The data structure of claim 1, wherein the security field comprises biometric authentication data including at least one of data representing a fingerprint, an iris scan, voice recognition, and DNA recognition.

7. The data structure of claim 1, wherein the data structure is serialized in an XML block.

8. The data structure of claim 1, wherein the security field comprises security rules.

9. The data structure of claim 8, wherein the security rules comprise Boolean combinations of security information.

10. The data structure of claim 8, wherein the security rules use addressable fields such as "To,""From," and "Reply To" fields from web services communications.

11. The data structure of claim 1, wherein presence of an entity is determined by at least one of published IM data, an endpoint reference, a WSDL contract, an Endpoint contract, presence of a machine on a network, time-of-day, an attempt to contact, peer to peer presence data, specific applications running, and an application mode.

12. The data structure of claim 1, wherein the data structure is enveloped by an embedded signature.

13. The data structure of claim 12, wherein the embedded signature is an XML enveloped signature.

14. The data structure of claim 1, further comprising an embedded security header.

15. The data structure of claim 1, wherein one or more endpoint addresses in the address field are designated as shareable or non-sharable.

16. The data structure of claim 1, further comprising a global identity version comprising a value that is incremented when contents of the address field are changed.

17. A data structure as recited in claim 1, wherein the address field includes at least one endpoint address that is a delegate address that is an address of a second entity and to which certain types of tasks have been delegated, such that one or more messages sent to the entity though identification of the entity by use of the Uber name will actually be routed to the second entity instead of the entity to which the one or more messages were originally addressed.

18. A method performed by a computer for creating a reference data structure comprising a SOAP header, the method comprising acts of:
creating an Uber identity field that includes an Uber name that globally identifies an entity and that associates the entity with a plurality of different endpoint addresses where one or more messages are deliverable to the entity and wherein the Uber name does not specify which of the plurality of endpoint addresses is used for sending a message to the entity;
creating an address field, the address field comprising:
the plurality of endpoint addresses, which are each associated with the entity;
one or more policies describing when a particular endpoint address is used, to send messages to the entity, the one or more policies comprising criteria including at least one of date and/or time ranges, sensitivity of data, urgency or priority of data, classification of data, topic of data, user selection as a result of prompting, a machine registered default, an application registered default, a user registered default, application specific logic, custom registered extensions, recipient attributes, and presence of an entity; and
wherein the address field specifies which of the plurality of endpoint addresses is used in delivering the one or more messages by implementing the one or more policies;
creating a security field that comprises one or more keys for facilitating secure communications with the entity though at least one of the plurality of endpoint addresses; and
serializing data in the address field and the security field to create a serialized data structure which is also extensible in so far as new address fields and new security fields may be added to the data structure in such a way as to be generally associated with the entity though the Uber identity, wherein the serialized data structure is stored in a computer readable medium of the computer.

19. The method of claim 18, further comprising merging the serialized data structure with another serialized data structure such that at least one additional endpoint address is added to the address field and/or one additional key is added to the security field.

20. The method of claim 19, further comprising resolving conflicts between endpoint address in the address field and in the another serialized data structure.

21. The method of claim 20, wherein resolving conflicts comprises at least one of securely prompting a user to resolve the conflict, using machine registered defaults, using application registered defaults, using user registered defaults, invoking application specific logic, using custom registered extensions, considering various aspects of the data being sent to an entity or actions desired and selecting the most recently entered endpoint address.

22. A computer readable storage medium having computer executable instructions for performing the acts recited in claim 18.

23. A method of communicating between endpoints on a network, the method comprising;
accessing a serialized extensible data structure comprising a SOAP header that is received over the network to obtain an endpoint address for an entity on the network, wherein the extensible data structure includes:
an Uber identity field that includes an Uber name that globally identifies an entity and that associates the entity with a plurality of different endpoint addresses where one or more messages are deliverable to the entity and wherein the Uber name does not specify which of the plurality of endpoint addresses is used for sending a message to the entity;
an address field, the address field comprising:
the plurality of endpoint addresses, which are each associated with the entity;
one or more policies describing when a particular endpoint address is used to send messages to the entity, the one or more policies comprising criteria including at least one of date and/or time ranges, sensitivity of data, urgency or priority of data, classification of data, topic of data, user selection as a result of prompting, a machine registered default, an application registered default, a user registered default, application specific logic, custom registered extensions, recipient attributes, and presence of an entity; and wherein the address field specifies which of the plurality of endpoint addresses is used in delivering the one or more messages by implementing the one or more policies;

a security field that comprises one or more keys for facilitating secure communications with the entity though at least one of the plurality of endpoint addresses; and wherein the contents of the Uber identity field, the address field and the security field are serialized in the data structure and wherein the data structure is extensible such that new address fields and new security fields may be added in such a way as to be generally associated with the entity though the Uber identity;

accessing the one or more policies that are included within the data structure to determine which endpoint address to select from the plurality of different endpoint addresses for the entity;

accessing the serialized extensible data structure to obtain a security key of the one or more keys;

encrypting data using the security key; and sending the data to the selected endpoint address for the entity on the network.

24. The method of claim 23, further comprising accessing security rules in the serialized extensible data structure to determine an appropriate security key to obtain.

25. The method of claim 23, further comprising receiving the serialized extensible data structure from a third party.

26. The method of claim 23, wherein determining which endpoint address to select comprises implementing rules based on at least one of a set of transport protocols available, date and/or time ranges, sensitivity of the data being sent, urgency or priority of the data, classification of the data, and the topic of the data.

27. A method as recited in claim 23, wherein the extensible data structure includes at least one address that is designated as non-sharable and wherein the recited method further includes forwarding the extensible data structure to one or more additional entities after first removing any addresses that are identified within the extensible data structure as being non-sharable.

* * * * *

UNITED STATES PATENT AND TRADEMARK OFFICE
CERTIFICATE OF CORRECTION

PATENT NO. : 7,636,939 B2  
APPLICATION NO. : 11/009926  
DATED : December 22, 2009  
INVENTOR(S) : Christopher G. Kaler et al.

Page 1 of 1

It is certified that error appears in the above-identified patent and that said Letters Patent is hereby corrected as shown below:

In column 10, line 49, in Claim 1, after "data" insert -- , --.

In column 11, line 2, in Claim 1, delete "though" and insert -- through --, therefor.

In column 11, line 29, in Claim 10, delete ""To,""From,"" and insert -- "To," "From," --, therefor.

In column 11, line 54, in Claim 17, delete "though" and insert -- through --, therefor.

In column 12, line 5, in Claim 18, delete "used," and insert -- used --, therefor.

In column 12, line 20, in Claim 18, delete "though" and insert -- through --, therefor.

In column 12, line 26, in Claim 18, delete "though" and insert -- through --, therefor.

In column 13, line 14, in Claim 23, delete "though" and insert -- through --, therefor.

In column 13, line 21, in Claim 23, delete "though" and insert -- through --, therefor.

Signed and Sealed this  
Tenth Day of May, 2011

David J. Kappos  
*Director of the United States Patent and Trademark Office*